(12) United States Patent
De Groot

(10) Patent No.: US 10,582,701 B2
(45) Date of Patent: Mar. 10, 2020

(54) METHOD AND SYSTEM FOR MANAGING DAIRY ANIMALS

(71) Applicant: LELY PATENT N.V., Maassluis (NL)

(72) Inventor: Ester De Groot, Maassluis (NL)

(73) Assignee: LELY PATENT N.V., Maassluis (NL)

( * ) Notice: Subject to any disclaimer, the term of this patent is extended or adjusted under 35 U.S.C. 154(b) by 561 days.

(21) Appl. No.: 15/313,444

(22) PCT Filed: May 1, 2015

(86) PCT No.: PCT/NL2015/050297
§ 371 (c)(1),
(2) Date: Nov. 22, 2016

(87) PCT Pub. No.: WO2015/183076
PCT Pub. Date: Dec. 3, 2015

(65) Prior Publication Data
US 2017/0142937 A1 May 25, 2017

(30) Foreign Application Priority Data
May 27, 2014 (NL) ..................................... 2012893

(51) Int. Cl.
*A01K 29/00* (2006.01)
*A01J 5/007* (2006.01)
(Continued)

(52) U.S. Cl.
CPC ............. *A01K 29/005* (2013.01); *A01J 5/007* (2013.01); *A01K 1/0011* (2013.01);
(Continued)

(58) Field of Classification Search
CPC ........ A01K 1/12; A01K 29/00; A01K 11/006; A01J 5/00; A01J 5/017; A01J 5/0175
(Continued)

(56) References Cited

U.S. PATENT DOCUMENTS 4,112,926 A * 9/1978 Schulman ............. A61B 5/1118
128/905
4,247,758 A * 1/1981 Rodrian ............... A61B 5/1105
119/14.08
(Continued)

FOREIGN PATENT DOCUMENTS

AU 725467 B2 10/2000
EP 0 657 098 A1 6/1995
(Continued)

Primary Examiner — Tien Q Dinh
Assistant Examiner — Ebony E Evans
(74) Attorney, Agent, or Firm — Birch, Stewart, Kolasch & Birch, LLP

(57) ABSTRACT

A living area includes a lying and eating area and a milking area. The living area is connected to a separation area by a selection device. A subgroup of dairy animals to be separated is determined together with a desired end time at which the dairy animals to be separated should be present in the separation area. For each individual dairy animal from the subgroup to be separated, an individual separation period is determined separately which runs from the individually determined start time until the end time. A dairy animal which walks to the selection device is guided by the selection device to the separation area if the dairy animal belongs to the subgroup of dairy animals to be separated and if said dairy animal is present at the selection device during the individual separation period determined for said dairy animal. The activity of each dairy animal in the group of dairy animals is observed by an observation system while the dairy animal is in the lying and eating area. The individual separation period of each individual dairy animal from the subgroup to be separated depends on the activity of said dairy animal observed by the observation system.

22 Claims, 1 Drawing Sheet

(51) Int. Cl.
 *A01K 1/00*    (2006.01)
 *A01K 1/12*    (2006.01)
 *A01K 11/00*    (2006.01)
 *B25J 11/00*    (2006.01)
 *A01K 1/10*    (2006.01)
 *A01K 7/00*    (2006.01)

(52) U.S. Cl.
 CPC .............. *A01K 1/0023* (2013.01); *A01K 1/12* (2013.01); *A01K 11/006* (2013.01); *B25J 11/0045* (2013.01); *A01K 1/10* (2013.01); *A01K 7/00* (2013.01)

(58) Field of Classification Search
 USPC .............. 119/14.02, 14.03, 14.08, 14.18, 174
 See application file for complete search history.

(56) References Cited

U.S. PATENT DOCUMENTS

| | | | | |
|---|---|---|---|---|
| 4,512,096 A * | 4/1985 | Heidecker | ............ | A01K 11/006 119/51.02 |
| 4,618,861 A * | 10/1986 | Gettens | ................ | A01K 11/006 340/10.41 |
| 5,901,660 A * | 5/1999 | Stein | .................... | A01K 11/006 119/174 |
| 6,342,839 B1 * | 1/2002 | Curkendall | .......... | A01K 11/007 340/573.3 |
| 6,427,627 B1 * | 8/2002 | Huisma | .................... | A01K 5/02 119/51.02 |
| 7,059,275 B2 * | 6/2006 | Laitinen | ............... | A01K 11/008 119/720 |
| 7,234,421 B2 * | 6/2007 | Natividade | .......... | A01K 11/008 119/174 |
| 7,370,606 B2 * | 5/2008 | van der Lely | ......... | A01K 29/00 119/51.01 |
| 7,726,258 B2 * | 6/2010 | Pratt | .................... | A01K 1/0023 119/51.02 |
| 7,874,263 B2 * | 1/2011 | Schulte | .................... | A01K 1/12 119/14.02 |
| 9,832,607 B2 * | 11/2017 | Won | ....................... | H04W 4/021 |
| 2007/0044732 A1 * | 3/2007 | Araki | ................... | A01K 11/008 119/721 |
| 2010/0012038 A1 * | 1/2010 | Petersen | .................. | A01K 1/12 119/14.01 |
| 2010/0192861 A1 * | 8/2010 | Van Hoven | ............... | A01K 1/12 119/14.03 |
| 2011/0239944 A1 * | 10/2011 | Huls | ........................ | A01J 5/007 119/14.02 |
| 2011/0268835 A1 * | 11/2011 | Marquess | ........... | C12Q 1/6883 426/2 |
| 2012/0125261 A1 * | 5/2012 | Van Den Berg | ..... | A01K 1/0023 119/14.02 |
| 2013/0269618 A1 * | 10/2013 | Song | .................... | A01K 29/005 119/14.08 |
| 2014/0311412 A1 * | 10/2014 | Hempenius | ............. | A01J 5/007 119/14.02 |

FOREIGN PATENT DOCUMENTS

| | | | | |
|---|---|---|---|---|
| NL | | 2008005 C | 6/2013 | |
| WO | | WO 00/70941 A1 | 11/2000 | |
| WO | WO 2008/089472 A1 * | | 7/2008 | ........... A01K 11/004 |
| WO | | WO 2011/014060 A1 | 2/2011 | |
| WO | | WO 2012/005673 A1 | 1/2012 | |

\* cited by examiner

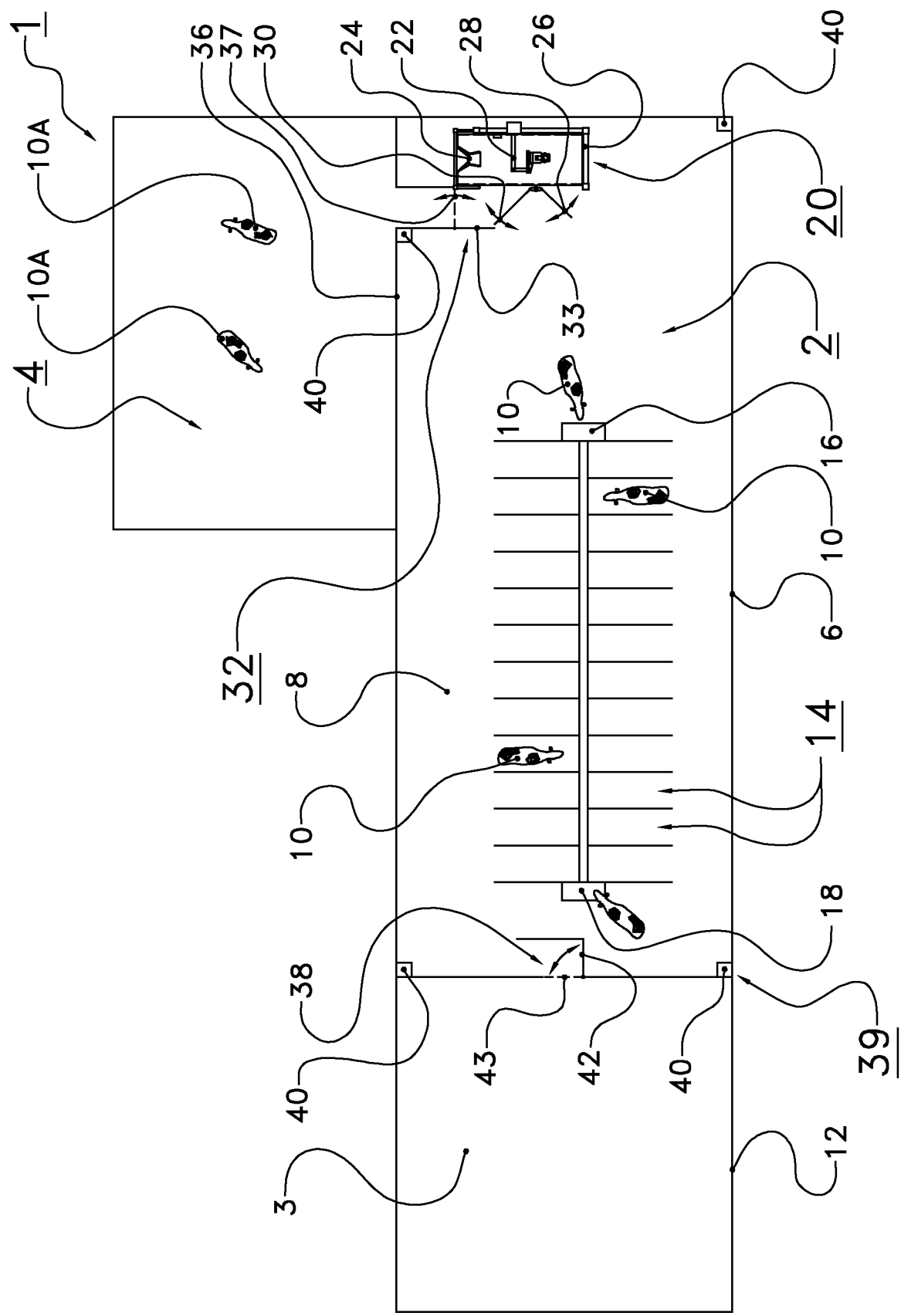

METHOD AND SYSTEM FOR MANAGING DAIRY ANIMALS

The invention relates to a method for managing a group of dairy animals, in particular cows.

It is generally known, for an automatic milking system, to separate a subgroup of dairy animals from a group of dairy animals which can wander freely in a living area formed by a stable, for example in order to inseminate or give medical treatment to the dairy animals from the separate subgroup. The aim is for the dairy animals to be separated have been separated from the other animals in the group, in a separation area separate from the living area, by a planned end time.

In an automatic milking system, the dairy animals visit by themselves a milking station which is equipped with a milking robot. To separate the dairy animals of the subgroup, in practice it is usual to set a predefined separation period which is the same for all dairy animals to be separated. The separation period is usually entered in a control system of the automatic milking system by entering a start time and the planned end time. When a dairy animal to be separated visits the milking station before the start of the separation period, after possible milking the dairy animal is returned to the living area. When a dairy animal to be separated visits the milking station during the separation period, the dairy animal is separated after leaving the milking station. In the separation period, the dairy animals to be separated are therefore guided to the separation area while the dairy animals which need not be separated are returned to the living area.

The duration of the separating period is necessarily a compromise which takes into account the different properties of the dairy animals to be separated. If the separation period is selected too long, the milking interval between two successive milkings for the separated milking animal may, as a result of long waiting times in the separation area, become so long that the milking behaviour and milk production of the separated dairy animals is disrupted. If the separation period is shortened however the risk that the dairy animals from the subgroup to be separated will not be separated in the separation area by the planned end time, increases.

NL2008005 discloses a method and a system for managing a group of dairy animals wherein, for each individual dairy animal from the subgroup of dairy animals to be separated, an individual separation period is selected which is dependent on a milking behaviour property of said individual dairy animal, for example the milking interval between two successive milkings. When the dairy animal visits the milking station during the individual separating period selected for said dairy animal, the dairy animal is separated from the subgroup of dairy animals to be separated, whereas before the start of this individual separation period said dairy animal is returned to the living area. Since an individual separation period is selected separately for each individual dairy animal from the subgroup of dairy animals to be separated, the individual separation period is not a compromise but is matched separately to each dairy animal to be separated. Because the separation period is adapted to the individual dairy animal, the separation period may be reduced while the risk remains constant that the dairy animals from the subgroup to be separated will not yet be separated by the planned end time.

Although the use of an individual separation period for each individual dairy animal represents a substantial improvement relative to the still usual practice of a common separation period for all dairy animals, there is a need to shorten the separation period further without increasing the risk that the dairy animals from the subgroup to be separated will not be separated in the separation area by the planned end time.

Therefore an object of the invention is to create a method and a system for managing a group of dairy animals, wherein separation of a subgroup of dairy animals from the group of dairy animals is improved, in particular wherein the individual separation period is reduced further while the dairy animals are reliably separated from the subgroup to be separated in the separation area by the planned end time.

This object is achieved according to the invention by a method for managing a group of dairy animals in a system for keeping dairy animals, wherein the system comprises:
- a living area such as a stable which comprises a lying and eating area and a milking area, wherein the milking area is provided with a milking station for automatic milking of a dairy animal, and wherein the dairy animals present in the lying and eating area can wander and/or lie down, for example in cubicles, and/or eat at a feed fence, and/or drink from a drinking trough,
- a selection device,
- a separation area separated from and/or delimited from the living area, which is connected, preferably via a walkable connection, to the living area by means of the selection device, wherein the separation area is preferably smaller than the living area, wherein the selection device can preferably be operated between a return state in which a dairy animal which has walked from the lying and eating area, possibly via the milking area and in that case preferably through the milking station, to the selection device, is returned by the selection device to the lying and eating area, and a separation state in which a dairy animal which has walked from the lying and eating area, possibly via the milking area and in this case preferably through the milking station, to the selection device, is guided by the selection device to the separation area and separated therein, wherein the method comprises:
- determining a subgroup of dairy animals to be separated from the group of dairy animals, wherein the subgroup to be separated comprises at least one dairy animal and preferably a plurality of dairy animals,
- determining an end time at which it is desired that the one or more dairy animals of the subgroup to be separated is/are in the separation area,
- determining separately an individual separation period for each individual dairy animal from the subgroup of dairy animals to be separated, wherein the individual separation period for each individual dairy animal from the subgroup of dairy animals to be separated begins at an individually determined start time and runs until and ends at the end time, and
- preferably determining whether a dairy animal which has walked to the selection device belongs to the subgroup of dairy animals to be separated, and preferably determining whether said dairy animal is present at the selection device before or during the individual separating period determined for said dairy animal,
- operating the selection device such that a dairy animal which has walked to the selection device is guided to the separation area provided that said dairy animal belongs to the subgroup of dairy animals to be separated and the dairy animal is present at the selection device during the individual separating period determined for said dairy animal, and preferably operating the selection device such that a dairy animal which has walked to the selection device is returned to the living area (i) if the dairy animal does not belong the subgroup to be separated, or (ii) that the dairy animal is present at the selection device before the individual separation period determined for said dairy animal, wherein in case (ii) the dairy animal may belong to the subgroup of dairy animals to be separated, wherein the activity of at least each dairy animal of the subgroup to be separated, preferably each individual dairy animal from the group of dairy animals, is observed by means of an observation system while said dairy animal is present in the lying and earing area and/or the milking area of the living area, i.e. the activity of at least each dairy animal of the subgroup to be separated, preferably each individual dairy animal of the group of dairy animals, is observed by means of the observation system at least in a period between successive visits of said dairy animal to the milking station, and wherein the individual separation period of each individual dairy animal from the subgroup to be separated is determined as a function of the activity of said dairy animal observed by the observation system.

According to the invention, the system comprises an observation system for observing the activity of each individual dairy animal present in the lying and eating area of the living area, and the method comprises the observation by the observation system of the activity of each individual dairy animal present in the lying and eating area of the living area, and the individual separation period of each individual dairy animal from the subgroup of dairy animals to be separated is determined as a function of the activity of said dairy animal observed by the observation system.

Using the method according to the invention, the individual separation period for each individual dairy animal of the subgroup of dairy animals to be separated is determined based on the observed activity of said dairy animal while the dairy animal is in the lying and eating area of the living area. When a dairy animal to be separated has walked to the selection device, according to the invention the observed activity of said dairy animal is taken into account to determine whether said dairy animal should be separated in the separation area or may be returned to the living area. The separation area has a smaller surface area than the living area, in particular a smaller surface area than the eating and lying area of the living area.

The individual separation period is defined for each dairy animal by a period from the individually determined start time preceding the end time, up to the end time by which it is desirable that the one or more dairy animals of the subgroup of dairy animals to be separated are separated in the separation area. In other words, all individual separation periods of the dairy animals to be separated end at the same end time, but the individually determined start time of the individual separating period may be different for each dairy animal. The individual start times are calculated separately but the result of the calculations may be the same. Although the individual start times are determined separately, two or more individual start times of the dairy animals to be separated may therefore be the same.

According to the invention, the individual separation period for each individual dairy animal from the subgroup of dairy animals to be separated is determined separately on the basis of the activity observed by the observation system for said dairy animal. This means that the start time of the individual separation period is determined for each dairy animal to be separated on the basis of the activity observed by the observation system for said dairy animal, as the individual separation periods for all dairy animals to be separated end at the same end time.

For example, on the basis of the activity observed by the observation system for said dairy animal, a behaviour parameter is determined as an intermediate step, and the individual separation period for each individual dairy animal from the subgroup of dairy animals to be separated is dependent on the behaviour parameter of said dairy animal which is determined for said dairy animal. The behaviour parameter for example gives an indication of the condition of the dairy animal, in particular its health, whether the dairy animal is in heat and/or whether the dairy animal is suffering from a disorder such as lameness or mastitis.

By taking into account the observed activity of each individual dairy animal, it is possible to separate the dairy animals to be separated more shortly before the planned end time, while the risk that the dairy animals will not be separated by the planned end time remains limited.

The subgroup of dairy animals to be separated also comprises at least one dairy animal. Since there is only one relevant separation period in the case where a single dairy animal is to be separated, the advantage of the invention is then scarcely perceived. The advantage is most evident in the case of a plurality of dairy animals in the subgroup. Therefore the subgroup of dairy animals to be separated advantageously comprises a plurality of dairy animals.

In one embodiment according to the invention, on the basis of the observed activity of each dairy animal of the subgroup to be separated, where applicable of each individual dairy animal of the group, which is present in the lying and eating area, a type of activity is determined for said dairy animal and the duration of said type of activity, wherein the individual separation period of each individual dairy animal from the subgroup of dairy animals to be separated is determined as a function of the type of activity determined for said dairy animal and the duration of said type of activity. Therefore on the basis of the observed activity of each individual dairy animal, it is analysed which type of activity the dairy animal is performing and for how long the dairy animal performs said type of activity. Then these activity data may for example be linked to the condition of the dairy animal. By taking into account the type of activity and the duration thereof when determining the individual separation period, the separation may be refined.

According to the invention it is also possible that on the basis of the observed activity of each individual dairy animal of the subgroup to be separated, where applicable of each individual dairy animal of the group, which is present in the lying and eating area, different types of activity are determined which are performed successively by said dairy animal in the lying and eating area, and the duration of each of said types of activity, and wherein the individual separation period of each individual dairy animal of the subgroup of dairy animals to be separated is determined as a function of the different types of activity determined for said dairy animal and duration thereof. By analysing the combination of different types of activity which a dairy animal performs successively in the living area, for example a condition or disorder of said dairy animal can be predicted which may constitute grounds for separating said dairy animal earlier.

According to the invention, different types of activity may be taken into account. For example the or each type of activity observed comprises at least one of the following: (i) lying, for example in at least one cubicle of the lying and eating area, (ii) walking through the lying and eating area, (iii) eating from a feed fence of the lying and eating area, (iv) drinking from at least one drinking trough of the lying and eating area, (v) standing close to other dairy animals in the lying and eating area and/or in the vicinity of a cow brush and/or in the vicinity of a feed station, for example at a distance which is less than 2 metres, preferably less than 1 metre, and/or (vi) standing separately from other dairy animals in the lying and eating area, for example at a distance which is greater than 2 metres, preferably greater than 5 metres. Thus for example a lying behaviour, walking behaviour, eating behaviour, drinking behaviour, social behaviour and/or ruminating behaviour can be analysed. These data and/or for example a diagnosis made on the basis thereof on the health of the dairy animal may then be taken into account for assessing precise the individual separation period of said dairy animal. This leads to optimisation of the individual separation period for each individual dairy animal.

In one embodiment according to the invention, on the basis of the observed activity of each individual dairy animal of the subgroup to be separated, where applicable each individual dairy animal of the group, which is present in the lying and eating area, an activity level is determined for said dairy animal, wherein the individual separation period of each individual dairy animal from the subgroup of dairy animals to be separated is determined as function of the activity level determined for said dairy animal. The activity level is preferably determined on the basis of the observed type or different types of activity performed by the dairy animal in the lying and eating area, and the duration of said type or each of said types of activity. By taking into account the activity level, it can be predicted relatively reliably whether the dairy animal present at the selection device will return once more before the planned end time if said dairy animal is returned to the living area, or should rather be separated now.

In one embodiment according to the invention, the activity level is determined on the basis of the activity observed during a set time period preceding the set end time, wherein the individual separation period of each individual dairy animal from the subgroup to be separated is determined as a function of the activity level determined for said dairy animal during the set time period preceding the set end time.

This takes into account the life rhythm of the animal, which influences the individual separation period to be determined. Thus in the case where the planned end time of a separation period for an animal to be separated falls in the morning, the separation period will in general be shorter than if the planned end time falls at the end of the day. In general, the dairy animals walk and eat more in the morning than at the end of the day, which is expressed in a certain activity level. In this way account is taken of the life rhythm or the spatio-temporal pattern of each dairy animal to be separated around the planned end time of the separation period. The spatio-temporal pattern of a dairy animal is expressed in the sequence and duration of the activities which the dairy animal performs in succession. The life rhythm of the animal is largely determined by the biologically determined circadian rhythm, and the circadian rhythm can only be influenced slightly by external factors such as for example lighting. Also, in this way, the separation period for each dairy animal can be refined which is dependent on a desired end time of the separation period.

After marking an animal for separation, the start time is calculated on the basis of the observed activity in the lying and eating area. Here the observed activity of a set period preceding the separation moment is used, such as for example the spatio-temporal pattern resulting from the observed activity of three weeks preceding the set end time.

Since a user can schedule weekly or biweekly separations of dairy animals, and the start time is calculated when marking for separation, the start time is generally established well before the established end time of the separation period. In the period from calculating the start time until the actual start time, the dairy animal to be separated may behave differently, whereby the calculated start time is no longer the best. The dairy animal may for example become lame and as a result walk more slowly and lie more than before it became lame. It is therefore advantageous to recalculate the start time shortly before the earlier established start time. Shortly here means for example a period of between a few minutes up to 24 hours.

When recalculating the start time, the observed activity of the three weeks preceding the established start or end time is compared with the actual pattern observed, which for example is based on a 24-hour observation of the activity of each dairy animal, and the start time is adapted in the case of deviations.

It is also possible to recalculate the individual separation period of a dairy animal, after it has been marked for separation, at the next visit of the animal to the selection device following the marking for separation.

According to the invention, it is possible that the individual separation period for each individual dairy animal from the subgroup of dairy animals to be separated is determined separately, so that the selection device is operated such that a dairy animal which walks to the selection device and is present at the selection device is guided to the separation area if the observed activity level lies below a threshold level for low activity. For a dairy animal with lower activity than normal, there is a risk that the dairy animal will visit the selection device again too late to be separated by the planned end time. If the observed activity level of a dairy animal lies below the threshold level for low activity, the individual separation period of said dairy animal for example may be set sufficiently long for said dairy animal to be separated the next time the dairy animal appears at the selection device.

Here the threshold level for low activity may be established separately for each individual dairy animal, preferably on the basis of historic activity data. For example, on the basis of historic activity data, an individual average activity level for the dairy animal is established and the threshold level for low activity determined by the individual average activity level is reduced by a predefined deviation. This deviation may be an absolute or a percentage deviation.

In a particular embodiment according to the invention, the individual separation period for each individual dairy animal from the subgroup of dairy animals to be separated is determined separately, so that the selection device is operated such that a dairy animal which walks to the selection device and is present at the selection device is guided to the separation area if the activity level lies above a threshold level for high activity. The threshold level for high activity for example forms an indication that the dairy animal is in heat. The dairy animal should then be separated in the separation area.

The threshold level for high activity, like the threshold level for low activity, may be set separately for each individual dairy animal on the basis of historic activity data. For example, the threshold level for high activity is determined by increasing the individual average activity level by a predefined deviation. This deviation may be an absolute or a percentage deviation.

According to the invention, the subgroup of dairy animals to be separated may for example be determined by entering the dairy animals to be separated directly into a control system. It is also possible that a separation criterion is entered in the control system, on the basis of which the control system determines which dairy animals must be separated from the group of dairy animals.

The observation system for observing the activity of each individual dairy animal in the lying and eating area may be configured in various ways according to the invention. Preferably the observation system is configured for observing in time or following the position and/or movement of each individual animal present in the lying and eating area and/or the milking area of the living area. Thus the or each type of activity may be determined on the basis of the observed position and/or movement of said dairy animal in the lying and eating area and/or the milking area of the living area. The duration of the or each type of activity determined is established on the basis of how long said dairy animal is observed to remain at a position or different positions. Such an observation system forms a "cow locator" system.

There are various possible configurations of the cow locator system. According to the invention, it is preferred that the cow locator system is fitted with a number of beacons, wherein each beacon is arranged at a fixed position in the living area at a distance from the other beacons, and wherein each beacon is designed to emit a signal with a fixed signal strength and with a signal frequency which differs from the signal frequency of the other beacons; sensors which are each mounted on one of the dairy animals, wherein each sensor is configured to receive the signals emitted by the beacons and measure the reception strength of each of the signals received; a control unit which is connected to the sensors for receiving the reception strength measured by the sensors of each of the signals emitted by the beacons, wherein the control unit is configured to determine the position of the dairy animals on the basis of the reception strength measured by the sensors of each of the signals emitted by the beacons. The sensors are for example attached to a collar which the animals wear.

Instead of or in addition to the cow locator system, the observation system for observing the activity of each individual dairy animal while the dairy animal is present in the lying and eating area, according to the invention comprises a number of step counters, wherein a step counter is mounted on each of the dairy animals, preferably on the leg of the dairy animals. Each step counter attached to a dairy animal is configured to count the steps taken by the dairy animal. With the step counters, according to the invention the activity of each individual dairy animal can be observed.

In one embodiment, the milking station comprises a milking robot for automatic milking in the milking station of a dairy animal which visits the milking station, wherein the milking station is connected to the selection device. The milking station forms part of an automatic milking system. A dairy animal of the group of dairy animals in the living area voluntarily visits the milking station. The dairy animal visiting the milking station is identified in or at the milking station, preferably by means of an identification system. If the dairy animal does not belong to the subgroup of dairy animals to be separated, or if the dairy animal visits the milking station before the individual separation period for said dairy animal, said dairy animal is returned by the selection device to the lying and eating area of the living area. If the dairy animal belongs to the subgroup of dairy animals to be separated and visits the milking station during the individual separation period for said dairy animal, said dairy animal is separated by means of the selection device. Also, voluntary milking cannot guarantee that each dairy animal will actually be separated.

According to the invention, it is preferred that a dairy animal which visits the milking station is enclosed in the milking station so that it can be milked by the milking robot, and wherein the dairy animal, after the possible milking of the dairy animal, the dairy animal is then released so that it can leave the milking station, and wherein after leaving the milking station, the dairy animal is guided directly to the selection device, i.e. is force-guided to the selection device. If a dairy animal must be separated, the dairy animal is first milked and then separated immediately afterwards. This is favourable for milk production and the milking behaviour of the animals. Nonetheless, the dairy animal may also be separated before the dairy animal enters the milking station, i.e. the selection device may also be erected before the milking station.

In one embodiment according to the invention, the individual separation period for said dairy animal may be selected as a function of a milking behaviour property of said dairy animal, preferably an individually desired milking interval for said dairy animal which is determined by the desired duration between two successive milkings for said dairy animal, and/or an individually averaged milking interval for said dairy animal which is determined by the average of a plurality of measured values for the duration between two successive milkings for said dairy animal, and/or an individually averaged visit interval for said dairy animal which is determined by the average of a plurality of measured values for the duration between two successive visits for said dairy animal to a milking station for milking the dairy animals. Instead of an interval, a frequency as a number of milkings or visits per 24 hours may be selected. The frequency is equal to 24 hours/interval. In this case the individual separation period of each dairy animal to be separated is dependent not only on the observed activity for said dairy animal in the lying and eating area, but also in addition on the milking behaviour property of said dairy animal. This makes separation even more favourable.

The invention also relates to a system for managing a group of dairy animals comprising:
  a living area such as a stable which comprises a lying and eating area and a milking area, wherein the milking area is provided with a milking station for the automatic milking of a dairy animal, and wherein the dairy animals may wander and/or lie in the lying and eating area, for example in cubicles, and/or eat at a feeding fence and/or drink from a drinking trough,
  a selection device,
  a separation area which is separate from and/or delimited from the living area, which is connected to the living area by means of the selection device, preferably via a walkable connection,
wherein the selection device can preferably be operated between a return state in which a dairy animal which walks from the lying and eating area, possibly via the milking area and in this case preferably through the milking station, to the selection device is returned by the selection device to the lying and eating area, and a separation state in which a dairy animal which walks from the lying and eating area, possibly via the milking area and in this case preferably through the milking station, to the selection device is guided by the selection device to a separate area and separated therein, a control system which is configured to:
  determine a subgroup of dairy animals to be separated from the group of dairy animals, wherein the subgroup to be separated comprises at least one dairy animal and preferably a plurality of dairy animals, determine an end time at which it is desired that the one or more dairy animals of the subgroup of dairy animals to be separated is/are present in the separation area, determine separately an individual separation period for each individual dairy animal from the subgroup of dairy animals to be separated, wherein the individual separation period for each individual dairy animal from the subgroup of dairy animals to be separated begins at an individually determined start time and continues and ends at the end time, and preferably determine whether a dairy animal which has walked to the selection device belongs to the subgroup of dairy animals to be separated, and preferably determine whether the dairy animal has is present at the selection device before or during the individual separation period determined for said dairy animal, operate the selection device such that a dairy animal which walks to the selection device is guided to the separation area if said dairy animal belongs to the group of dairy animals to be separated, and said dairy animal is present at the selection device during the individual separation period determined for said dairy animal, and preferably operate the selection device such that a dairy animal which has walked to the selection device is returned to the living area if (i) the dairy animal does not belong to the subgroup of dairy animals to be separated, or (ii) the dairy animal is present at the selection device before the individual separation period determined for said dairy animal, wherein in case (ii) the dairy animal may belong to the subgroup of dairy animals to be separated, wherein the system is provided with an observation system for observing at least the activity of each dairy animal of the subgroup of dairy animals to be separated, preferably each dairy animal of the group of dairy animals, while said dairy animal is present in the lying and/or eating area and/or milking area of the living area, and the control system is connected to the observation system for receiving the activity of at least each dairy animal of the subgroup to be separated, preferably each dairy animal of the group of dairy animals, which is observed by the observation system while the dairy animal is present in the lying and eating area, i.e. in a period between successive visits of each dairy animal to the milking station, and the control system is configured to determine the individual separation period of each individual dairy animal from the subgroup of dairy animals to be separated as a function of the activity received for said dairy animal.

The system according to the invention may be combined with one or more of the properties described above for the method according to the invention, both separately and in any arbitrary combination. The system according to the invention also has the same technical effects and advantages as described above in the description of the method according to the invention.

The invention will now be described in more detail with reference to the drawing, wherein an exemplary embodiment of a system for managing a group of dairy animals according to the invention is depicted diagrammatically.

The system for managing a group of dairy animals 10 according to the invention is indicated as a whole in FIG. 1 with reference numeral 1. The system 1 comprises a living area which contains a lying and eating area 2 and a milking area. In this exemplary embodiment, the living area 2 spreads out partly in a stable. On one side of the lying and eating area 2 is a feed fence 6. Next to the feed fence 6 is a feed alley which forms part of the stable (not shown). The lying and eating area 2 comprises furthermore for example a slatted floor 8, a plurality of cubicles 14, a concentrate trough 16 and a drinking trough 18. The dairy animals 10 may wander round in the lying and eating area 2, lie in the cubicles 14, eat at the feed fence 6, eat from the feed concentrate trough 16 and/or drink from the drinking trough 18.

The milking area comprises a milking station 20 for automatic milking of each dairy animal 10 from the group of dairy animals 10. The milking station 20 is arranged in the stable. The milking station 20 comprises a robot arm 22 and a second feed concentrate trough 24. The milking station 20 comprises an entrance door 28 and an exit door 30. The entrance door 28 and exit door 30 can for example each be operated remotely between an open state as shown in the figure and a closed state (not shown). The entrance door 28 and exit door 30, together with a fence 26, form a milking stall in which a dairy animal 10 can be enclosed for milking. Although not shown in this exemplary embodiment, the milking area may for example also comprise a waiting area.

After each dairy animal 10 has been milked in the milking station 20, or if the dairy animal 10 cannot or should not be milked, some time after the dairy animal 10 has been held in the milking station, the dairy animal 10 is released by the opening of the exit door 30. After leaving the milking station 20 via the exit door 30, the dairy animal is guided directly to the selection device 32. In other words, when the dairy animal 10 leaves the milking station 20, the dairy animal 10 can only walk to the selection device 32. By means of the selection device 32, the animal may be selectively returned to the stable area 2 or guided to a separation area 4. The separation area 4 is delimited for example by means of a fence 36.

In this exemplary embodiment, the selection device 32 comprises a separation door 33 which can be operated between a separation state shown in the figure, and a return state indicated with dotted line 37. In the return state the separation door 33 creates access to the lying and eating area 2, while the separation door 33 at the same time shuts off the separation area 4. In the separation state, the separation door 33 creates access to the separation area 4 and at the same time the separation door 33 shuts off the lying and eating area 2. In the return state, a dairy animal 10 present at the selection device 32 is returned through the separation door 33 to the lying and eating area 2. In the separation state, the dairy animal 10 present at the selection device 32 is guided by the separation door 33 into the separation area 4 and separated therein.

The system 1 is provided with a control system (not shown). The control system comprises for example a computer. The control system controls the milking station 20 and also operates the separation door 33 of the selection device 32. Evidently the control system may be constructed from a plurality of control units which for example include a control unit for operating the milking station 20 and a control unit for operating the selection device 32.

In addition, in this exemplary embodiment, the control system is connected to an identification system (not shown) for identifying each dairy animal of the group of dairy animals 10. The identification system comprises for example an identification device mounted on the entrance door 28 and/or on the feed trough 24 of the milking station 20. The identification device is configured to cooperate with a sensor provided on each dairy animal 10. The sensor contains for example a transponder mounted in a collar of the dairy animals 10. The transponder may contain an RFID.

According to the invention, the lying and eating area 2 and/or the milking area of the living area contains an observation system 39 for observing the activity of each individual dairy animal 10 which is present in the lying and eating area 2 and/or the milking area. The observation system 39 in this exemplary embodiment is configured to observe in time or follow the position and/or movement of each individual dairy animal 10 which is present in the lying and eating area 2 and/or the milking area, i.e. the observation system 39 in this exemplary embodiment forms a cow locator system.

The cow locator system may be configured in various ways. In this exemplary embodiment, the cow locator system 39 comprises a number of beacons 40 which are each arranged at a fixed position in the living area at a distance from each other. The beacons 40 in this exemplary embodiment are situated in the corners of the lying and eating area 2 at a height above the dairy animals 10, and on the roof structure of the stable. Each bacon 40 is configured to emit a signal with a fixed signal strength and with a signal frequency which differs from the signal frequency of the other beacons 40. The sensors worn by the dairy animals 10 are configured to receive the signals emitted by the beacons 40 and measure the reception strength of the signals received.

The cow locator system 39 comprises a control unit (not shown) which may form part of the control system. The control unit of the cow locator system 39 is connected to the sensors worn by the dairy animals 10 for receiving the signal strength measured by the sensors of each of the signals emitted by the beacons 40. The control unit of the cow locator system 39 is configured to determine the position of the dairy animals 10 on the basis of the reception strength measured by the sensors of each of the signals emitted by the beacons 40. Therefore the position of the dairy animals 10 in the lying and eating area 2 can be observed and monitored over time in order to determine the movement of the dairy animals 10 in the stable area 2.

According to the invention, a subgroup of dairy animals 10A is separated from the group of dairy animals 10 as follows.

In the control system, the subgroup of dairy animals 10A to be separated is determined. For example, the dairy animals 10A to be separated may be entered directly in the control system. It is also possible that a separation criterion is entered in the control system, on the basis of which the control system determines which dairy animals 10A must be separated from the group of dairy animals 10. Then an end time is entered in the control system, by which the dairy animals 10A of the subgroup of dairy animals to be separated should be separated in the separation room 4, i.e. separated from the group of dairy animals 10 in the lying and eating area 2. Furthermore, in the control system an individual separation period is determined separately for each individual dairy animal 10A of the group of dairy animals 10A to be separated, which period begins at an individually determined start time preceding the end time entered and runs until the end time. The individual separation period for each dairy animal 10A is stored in the control system.

The individual start time may be determined at the moment that the end time is established for the separation period for the subgroup of dairy animals to be separated to which the dairy animal belongs. However the control system may also be configured such that the individual separation period is determined or recalculated when the animal to be separated is present at the selection device and is identified there as a dairy animal to be separated. In both cases, the individual separation period is established as a function of the observed activity of said dairy animal. The dairy animals 10 in this exemplary embodiment may largely wander freely in the lying and eating area 2. It is also possible that the dairy animals can only reach the milking station 20 along prescribed routes, such as for example the "forced cow traffic" system. The dairy animals 10 voluntarily visit the milking station 20 to be milked automatically. When a dairy animal 10 visits the milking station 20, the dairy animal is identified at the entrance door 28 and/or at the feed trough 24. The control system can then establish whether the dairy animal 10 belongs to the subgroup of dairy animals 10A to be separated.

If the dairy animal 10 does not belong to the subgroup of dairy animals 10A to be separated, said dairy animal need not be separated. In this case, the control system ensures that the separation door 33 remains in the return state. Thus the dairy animal 10 leaves the milking station 20 via the exit door 30 and is returned by the separation door 33 to the lying and eating area 2.

If however it appears from the identification at the entrance door 28 and/or the feed trough 24 of the milking station 20 that the dairy animal belongs to the subgroup of dairy animals 10A to be separated, the control system then determines whether the time at which the dairy animal 10A is identified falls within the individual separation period for said dairy animal 10A. If the time lies within the individual separation period for said dairy animal 10A, the control system operates the separation door 33 of the selection device 32 such that after leaving the milking station 20, said dairy animal 10A is guided to the separation area 4.

If the time at which the dairy animal 10A is identified at the entrance door 28 and/or at the feed trough 24 of the milking station 20 does not however lie within the individual separation period for said dairy animal, the control system ensures that the separation door 33 of the selection device 32 is in the return state. Thus the dairy animal 10A leaving the milking station 20 via the exit door 30 is returned by means of the separation door 33 to the lying and eating area 2.

If the same dairy animal 10A later returns to the milking station 20 to be milked, the control system again determines whether said dairy animal 10A is present at that time within the individual separation period for said dairy animal 10A. If said time lies within the individual separation period for said dairy animal 10A, the separation door 33 is brought by the control system to the separation state so that the dairy animal 10A is separated in the separation area 4. First however the dairy animal 10A is milked again.

According to the invention, the individual separation period of each individual dairy animal 10A from the subgroup of dairy animals to be separated is determined as a function of the activity of said dairy animal which is observed by the observation system 40 while the dairy animal is present in the lying and eating area 2. When a dairy animal 10A to be separated visits the selection device 32, the observed activity performed by said dairy animal 10A in the lying and eating area 2 is taken into account to determine whether the dairy animal 10A should be separated at that moment in the separation area 4 or returned to the lying and eating area 2. In this way the individual separation period for each dairy animal 10A to be separated can be kept as short as possible, so that the waiting time in the separation area 4 is minimised.

In this exemplary embodiment, on the basis of the observed activity of each individual dairy animal 10 which is present in the stable area 2, different types of activity and the duration of the or each type of activity is determined. In other words, on the basis of the observed activity of each individual dairy animal, it is analysed which types of activity said dairy animal performs successively and for how long said dairy animal performs these types of activity. The control system can then distinguish between the following types of activity: (i) lying in at least one cubicle 14, (ii) walking through the lying and eating area 2, (iii) eating at the feed fence 6, (iv) drinking from the drinking trough 18, (v) standing close to other dairy animals and/or in the vicinity of a cow brush (not shown) and/or in the vicinity of the feed concentrate trough 16 or the drinking trough 18, for example at a distance which is less than 2 metres, preferably less than 1 metre, and/or (vi) standing separately from other dairy animals, for example at a distance which is greater than 2 metres, preferably greater than 5 metres.

By observing the activities and the times of activities which a dairy animal usually performs successively, a spatio-temporal pattern of a dairy animal may be established. This pattern may be used to establish the individual separation period. For example, for the dairy animal 10A to be separated, it may be known that after the activity of drinking from the drinking trough 18, she usually walks to the milking robot. Also, the drinking periods of this animal are known. When establishing the individual start time of the separation period, it can be considered which drinking period lies closest in time to the established separation end time, and then the individual start time can be established at the end of the drinking period.

Instead of various activities performed in succession, according to the invention it is also possible to select a specific activity, such as for example lying, to determine the individual separation period on the basis of the observed activity and duration.

For example, for dairy animal 10A, the cow locator system has observed that each day she has a lying period of three successive hours between 10:00 and 13:00. This may be taken into account when determining the individual separation period. If the end time of the separation period falls within this lying period of the dairy animal 10A, the individual start time may be set at a time which lies before the start of this dairy animal. Consequently, the animal may lie in the separation area and still be separated on time.

In the observation of activity by means of the observation system 39 therefore for example the lying behaviour, walking behaviour, eating behaviour, drinking behaviour, social behaviour and/or ruminating behaviour in the lying and eating area 2 may be analysed. Then these activity data may be linked for example to the condition of the dairy animal, the health of the dairy animal, or whether the dairy animal is in heat, and/or whether the dairy animal is suffering from a disorder such as lameness or mastitis. The observed activity data are then taken into account by the control system to determine the individual separation period of each dairy animal 10A to be separated. This leads to optimisation of the individual separation period for each individual dairy animal 10A to be separated.

In particular, on the basis of the observed activity of each individual dairy animal which is present in the lying and eating area 2, an activity level for said dairy animal 10A is calculated. The individual separation period of each individual dairy animal 10A from the subgroup of dairy animals to be separated is then determined as a function of the activity level determined for said dairy animal 10A. By taking account of the activity level, it can be predicted relatively reliably whether the dairy animal 10A present at the selection device 32 will return once more to the milking station 20 before the planned end time if the dairy animal 10A is returned to the lying and eating area 2, or whether she should rather be separated now.

The activity level of a dairy animal is for example a weighted average of various activities and the durations thereof over a specific period, wherein for example walking, eating and drinking may be weighted more heavily than lying and for example standing at a location not close to the robot.

For a dairy animal 10A to be separated with a lower activity than normal, there is an increased risk that said dairy animal 10A will visit the milking station 20 again too late to be separated by the planned end time. If the observed activity level of said dairy animal 10A lies below a threshold level for low activity, the individual separation period of the dairy animal 10A is selected such that, by means of the selection device 32, the dairy animal 10A is separated the next time said dairy animal 10A visits the milking station 20. The threshold level for low activity may be established separately for each individual dairy animal, preferably on the basis of historic activity data.

In one embodiment, the activity level is determined on the basis of the activity observed during a set time period preceding the set end time, and the individual separation period of each individual dairy animal from the subgroup to be separated is determined as a function of the activity level for said dairy animal which was observed during the set time period preceding the set end time. For example, a continuous weighted average of the activity level over 21 days may be determined, from which a normal activity level for said dairy animal is known.

The individual separation period for each individual dairy animal 10A to be separated is furthermore selected in this exemplary embodiment as a function of a milking behaviour property of said dairy animal 10A. For example, the individual separation period may be selected as a function of the individually desired milking interval for said dairy animal 10A, which is determined by the desired duration between two successive milkings by the milking station 20 for said dairy animal 10A. Alternatively, the individual separation period may be selected as a function of the individual average milking interval for said dairy animal 10A, which is determined by the average of a plurality of measured values for the time period between two successive milkings by the milking station 20 for said dairy animal 10A. In a further alternative, the individual separation period is selected as a function of the individual average visit interval for said dairy animal 10A, which is determined by the average of a plurality of measured values for the duration between two successive visits to the milking station 20 for said dairy animal 10A.

The lying and eating area 2 is connected via a second selection device 38 to a pasture area 3 for the dairy animals 10. In this exemplary embodiment, the pasture area 3 is delimited by means of a fence 12. In the pasture area 3, the dairy animals 20 can wander freely outside and eat grass.

The second selection device 38 in this exemplary embodiment comprises an identification device (not shown) for identifying each dairy animal of the group of dairy animals 10, and a selection fence 42 which can be operated between a first state shown in the figure and a second state indicated by a dotted line 43. In the second state, the pasture area 3 is shut off by means of the selection fence 42 so that a dairy animal is guided back to the stable area 2. In the first state, the selection fence 42 creates access to the pasture area 3 and at the same time the selection fence 42 shuts off the stable area 2. In the first state, the dairy animal 10 is guided by the second selection device 38 through the selection fence 42 to the pasture area 3.

The second selection device 38 with a selection fence 42 is controlled by the control system. The selection fence 42 for example only opens to the pasture area 3 for a dairy animal 10 of which the most recent milking has taken place less than a preset period ago, whereby the preset period is determined as a function of the desired milking interval for the dairy animal 10 and the activity of said dairy animal 10 observed by the observation system 39. Thus the chance is increased that the dairy animal 10 will not be too far from the milking station 20 when the desired milking interval expires. It is also possible to open the selection fence 42 to the pasture area 3 only if the duration until the end time of the individual separation period for said dairy animal 10 is still either a predefined minimum duration or at most a predefined part of the individual separation period determined for the dairy animal 10 has elapsed. Here the predefined minimum duration and/or the individual separation period may be determined as a function of the activity of said dairy animal 10 observed by the observation system 39. This prevents the dairy animal 10 from being too far away from the milking station 20 at the time when the end time for separation is reached. The chance of correct separation is therefore not negatively affected by the dairy animals 10 wandering too far away.

It is noted that operation of the second selection device 38 on the basis of the activity of the dairy animals 10 observed by the observation system 39 according to the invention has independent significance. The invention therefore according to a second aspect relates to a method for managing a group of dairy animals in a system for keeping dairy animals, wherein the system comprises:

a living area such as a stable which comprises a lying and eating area and a milking area, wherein the milking area is provided with a milking station for automatic milking of a dairy animal, a selection device, a pasture area separate from the living area which is connected to the living area by means of the selection device, characterized in that the activity of each dairy animal of the group of dairy animals is observed by means of an observation system while said dairy animal is present in the lying and eating area, and that the selection device is operated as a function of the activity of said dairy animal observed by the observation system.

It is possible that, on the basis of the observed activity of each individual dairy animal of the group of dairy animals which is present in the lying and eating area, a type of activity for said dairy animal is determined and the duration of said type of activity, and wherein the selection device is operated as a function of the type of activity determined for said dairy animal and the duration of said type of activity. Also, on the basis of the observed activity of each individual dairy animal of the group of dairy animals which is present in the lying and eating area, different types of activity may be determined which are performed successively by each dairy animal in the lying and eating area and the duration of each of said types of activity, and wherein the selection device is operated as a function of on the different types of activity determined for said dairy animal and the duration thereof. Furthermore, it is possible that the or each type of activity comprises at least one of the following activities: (i) lying, for example in at least one cubicle of the lying and eating area, (ii) walking through the lying and eating area, (iii) eating from a feed fence in the lying and eating area, (iv) drinking from at least one drinking trough in the lying and eating area, (v) standing close to other dairy animals in the lying and eating area and/or in the vicinity of a cow brush and/or in the vicinity of a feed station, for example at a distance which is less than 2 metres, preferably less than 1 metre, and/or (vi) standing separately from other dairy animals in the lying and eating area, for example at a distance which is greater than 2 metres, preferably greater than 5 metres. Also, on the basis of the observed activity of each individual dairy animal of the group of dairy animals in the lying and eating area, an activity level may be determined for said dairy animal, and wherein the selection device is operated as a function of the activity level determined for said dairy animal.

According to this second aspect, the invention also relates to a system for managing a group of dairy animals comprising:

a living area such as a stable which comprises a lying and eating area and a milking area, wherein the milking area is provided with a milking station for automatic milking of a dairy animal, a selection device, a pasture area separate from the living area, which is connected to the living area by means of the selection device, a control system, characterized in that the system is provided with an observation system for observing the activity of each dairy animal of the group of dairy animals, at least while said dairy animal is present in the lying and eating area, and the control system is connected to the observation system for receiving the activity of each individual dairy animal which is observed by the observation system while the dairy animal is present in the lying and eating area, and the control system is configured to operate the selection device as a function of the activity of said dairy animal observed by the observation system.

In the system according to this second aspect, the control system may be configured, on the basis of the observed activity of each individual dairy animal of the group of dairy animals which is present in the lying and eating area, to determine a type of activity for said dairy animal and the duration of said type of activity, and wherein the control system is configured to operate the selection device as a function of the type of activity determined for said dairy animal and the duration of said type of activity. It is also possible that the control system is configured, on the basis of the observed activity of each individual dairy animal of the group of dairy animals which is present in the lying and eating area, to determine different types of activity which are performed successively by said dairy animal in the lying and eating area and the duration of each of said types of activity, and wherein the control system is configured to operate the selection device as a function of the different types of activity determined for said dairy animal and the duration thereof. The or each type of activity may comprise at least one of the following: (i) lying, for example in at least one cubicle of the lying and eating area, (ii) walking through the lying and eating area, (iii) eating from a feed fence of the lying and eating area, (iv) drinking from at least one drinking trough of the lying and eating area, (v) standing close to other dairy animals in the lying and eating area and/or in the vicinity of a cow brush and/or in the vicinity of a feed station, for example at a distance which is less than 2 metres, preferably less than 1 metre, and/or (vi) standing separately from other dairy animals in the lying and eating area, for example at a distance which is greater than 2 metres, preferably greater than 5 metres. Preferably, the control system is configured, on the basis of the observed activity of each individual dairy animal of the group of dairy animals which is present in the lying and eating area, to determine an activity level for said dairy animal, wherein the control system is configured to operate the selection device as a function of the activity level determined for said dairy animal.

According to the second aspect of the invention, preferably, if one of the dairy animals has walked to the selection device and is identified at time of visiting the selection device, an individual expected pasture round time is determined on the basis of the activity of said dairy animal observed by the observation system. In this case, the remaining time from the visit time to an end time by which it is desired that said dairy animal should be present in the living area or in a separation area and/or until expiry of the milking interval for said dairy animal, may be compared with the individual expected pasture round time, wherein the selection device is operated on the basis of said comparison. The determination of individual expected pasture round time and the comparison step are performed by the control system.

The individual expected pasture round time of each dairy animal is the expected duration that said dairy animal spends in the pasture area before said dairy animal voluntarily returns to the living area. The milking interval is for example a desired milking interval which is determined by the desired duration between two successive milkings by the milking station, or for example an average milking interval which is determined by the average of a plurality of measured values for the duration between two successive milkings by the milking station. The desired and/or average milking interval may be determined individually for each dairy animal from the group.

If the individual expected pasture round time for example expires after the end time by which it is desired that the dairy animal should be present in the living area or the separation area, and/or if the individual expected pasture round time lasts longer than the remaining time until the end of the milking interval, the identified dairy animal is returned to the living area by the selection device. The dairy animal is then not allowed into the pasture area. This reduces the risk that the dairy animal will still be wandering in the pasture area when the dairy animal should be milked or separated. If the expected pasture round time expires before the end time at which it is desired that the dairy animal has returned to the living area, and/or if the expected pasture round time is shorter than the time remaining until expiry of the milking interval, the identified dairy animal is guided to the pasture area by the selection device. As the observed activity of the dairy animal is taken into account when determining the individual expected pasture round time, the criterion for allowing access to the pasture area is refined, while the risk that the dairy animal will have to be retrieved from the pasture area remains low.

The observation system according to the second aspect of the invention may be configured as described in claim 8 and/or claim 9, and claim 19 and/or 20 respectively.

The invention is not limited to the exemplary embodiment shown in the drawing. The person skilled in the art may make various adaptations which lie within the scope of the invention. For example, it is possible to perform the separation before milking. Furthermore, separation may be performed at a different location in the system, for example at a feed station, such as the feed concentrate trough 16 or the drinking trough 18. Instead of creating access to a pasture area, the second selection device 38 may create access to a separate stable area, for example a straw bedded pen. The separate stable area may then be regarded as a separation area.

The invention claimed is:

1. A method for managing a group of dairy animals in a system for keeping dairy animals, wherein the system comprises:
    a living area which comprises a lying and eating area and a milking area, wherein the milking area is provided with a milking station for automatic milking of a dairy animal;
    a selection device;
    a separation area which is separate from the living area and is connected to the living area by means of the selection device;
    wherein the method comprises the steps of:
    determining a subgroup of dairy animals to be separated from the group of dairy animals, the subgroup of dairy animals comprising one or more dairy animals;
    determining an end time at which it is desired that the one or more dairy animals of the subgroup to be separated is/are present in the separation area;
    determining separately an individual separation period for each individual dairy animal from the subgroup to be separated, wherein the individual separation period runs from an individually determined start time until the end time;
    operating the selection device such that a dairy animal which has walked to the selection device is guided to the separation area if said dairy animal belongs to the subgroup to be separated, and said dairy animal is present at the selection device during the individual separating period determined for said dairy animal;
    observing the activity of at least each dairy animal of the subgroup to be separated by means of an observation system while said dairy animal is present in the lying and eating area; and
    determining the individual separation period of each individual dairy animal from the subgroup to be separated as a function of the activity of said dairy animal observed by the observation system,
    wherein on the basis of the observed activity of each dairy animal of the subgroup to be separated which is present in the lying and eating area, an activity level is determined for said dairy animal, and wherein the individual separation period of each individual dairy animal from the subgroup to be separated is determined as a function of the activity level determined for said dairy animal.

2. The method according to claim 1, wherein on the basis of the observed activity of each dairy animal of the subgroup to be separated which is present in the lying and eating area, a type of activity is determined for said dairy animal and the duration of said type of activity, and wherein the individual separation period of each individual dairy animal from the subgroup to be separated is determined as a function of the type of activity determined for said dairy animal and the duration of said type of activity.

3. The method according to claim 2, wherein the or each sort of activity comprises at least one of the following:
    lying in at least one cubicle of the lying and eating area;
    walking through the lying and eating area;
    eating at a feed fence of the lying and eating area;

drinking from at least one drinking trough of the lying and eating area;

standing close to other dairy animals in the lying and eating area and/or in the vicinity of a cow brush and/or in the vicinity of a feed station; and/or standing separately from other dairy animals in the lying and eating area.

4. The method according to claim 1, wherein on the basis of the observed activity of each dairy animal of the subgroup to be separated which is present in the lying and eating area, different types of activity are determined which are performed successively by said dairy animal in the lying and eating area and the duration of each of the types of activity, and wherein the individual separation period of each individual dairy animal from the subgroup to be separated is determined as a function of said different types of activity determined for said dairy animal and the duration thereof.

5. The method according to claim 1, wherein the activity level is determined on the basis of the activity observed during a set time period preceding the set end time, wherein the individual separation period of each individual dairy animal from the subgroup to be separated is determined as a function of the activity level determined for said dairy animal during the set time period preceding the set end time.

6. The method according to claim 1, wherein the individual separation period for each individual dairy animal from the subgroup to be separated is determined separately, so that the selection device is operated such that when said dairy animal is present at the selection device, said dairy animal is guided to the separation area if the observed activity level lies below a threshold level for low activity.

7. The method according to claim 6, wherein the threshold level for low activity for each individual dairy animal from the subgroup to be separated is selected individually.

8. The method according to claim 1, wherein the observation system is configured for observing the position of each individual dairy animal present in the lying and eating area and/or the milking area of the living area.

9. The method according to claim 8, wherein the observation system is fitted with:

a number of beacons, wherein each beacon is arranged at a fixed position in the living area at a distance from the other beacons, and wherein each beacon is configured to emit a signal with a fixed signal strength and with a signal frequency which differs from the signal frequency of the other beacons;

sensors which are each mounted on one of the dairy animals, wherein each sensor is configured to receive the signals emitted by the beacons and measure the reception strength of each of the signals received; and a control unit which is connected to the sensors for receiving the reception strength measured by the sensors of each of the signals emitted by the beacons, wherein the control unit is configured to determine the position of the dairy animals on the basis of the reception strength measured by the sensors of each of the signals emitted by the beacons.

10. The method according to claim 9, wherein a dairy animal which visits the milking station is enclosed in the milking station so that it can be milked by a milking robot, and wherein after the possible milking of the dairy animal, the dairy animal is then released so that it can leave the milking station, and wherein after leaving the milking station, the dairy animal is guided to the selection device.

11. The method according to claim 1, wherein the individual separation period for said dairy animal is selected as a function of a milking behaviour property of said dairy animal, an individually desired milking interval for said dairy animal being determined by the desired duration between two successive milkings for said dairy animal, and/or an individually averaged milking interval for said dairy animal being determined by the average of a plurality of measured values for the duration between two successive milkings for said dairy animal, and/or an individually averaged visit interval for said dairy animal being determined by the average of a plurality of measured values for the duration between two successive visits for said dairy animal to a milking station for milking the dairy animals.

12. A system for managing a group of dairy animals comprising:

a living area which comprises a lying and eating area and a milking area, wherein the milking area is provided with a milking station for automatic milking of a dairy animal;

a selection device;

a separation area which is separate from the living area and is connected to the living area by means of the selection device;

a control system which is configured to:
determine a subgroup of dairy animals to be separated from the group of dairy animals, the subgroup of dairy animals comprising one or more dairy animals;

determine an end time at which it is desired that the one or more dairy animals of the subgroup to be separated is/are present in the separation area;

determine separately an individual separation period for each individual dairy animal from the subgroup to be separated, wherein the individual separation period for each individual dairy animal from the subgroup of dairy animals to be separated runs from a start time determined individually by the control system until the end time; and operate the selection device such that a dairy animal which has walked to the selection device is guided to the separation area if said dairy animal belongs to the subgroup to be separated, and said dairy animal is present at the selection device during the individual separating period determined for said dairy animal, wherein the system is provided with an observation system for observing at least the activity of each dairy animal of the subgroup of dairy animals to be separated, at least while said dairy animal is present in the lying and/or eating area, wherein the control system is connected to the observation system for receiving the activity of each individual dairy animal of the subgroup to be separated which is observed by the observation system while said dairy animal is present in the lying and eating area, wherein the control system is configured to determine the individual separation period of each individual dairy animal from the subgroup to be separated as a function of the activity received for said dairy animal, wherein the control system is configured, on the basis of the observed activity of each dairy animal of the subgroup to be separated which is present in the lying and eating area, to determine an activity level for said dairy animal, and wherein the control system is configured to determine the individual separation period of each individual dairy animal from the subgroup to be separated as a function of the activity level determined for said dairy animal.

13. The system according to claim 12, wherein the control system is configured, on the basis of the observed activity of each dairy animal of the subgroup to be separated which is present in the lying and eating area, to determine a type of activity for said dairy animal and the duration of said type of activity, and wherein the control system is configured to determine the individual separation period of each individual dairy animal from the subgroup to be separated as a function of the type of activity specified for said dairy animal and the duration of the type of activity.

14. The system according to claim 13, wherein the or each type of activity comprises at least one of the following:
lying in at least one cubicle of the lying and eating area;
walking through the lying and eating area;
eating at a feed fence of the lying and eating area;
drinking from at least one drinking trough of the lying and eating area;
standing close to other dairy animals in the lying and eating area and/or in the vicinity of a cow brush and/or in the vicinity of a feed station; and/or
standing separately from other dairy animals in the lying and eating area.

15. The system according to claim 12, wherein the control system is configured, on the basis of the observed activity of each dairy animal of the subgroup to be separated which is present in the lying and eating area, to determine different types of activity which are performed successively by said dairy animal in the lying and eating area and the duration of each of the types of activity, and wherein the control system is configured to determine the individual separation period of each individual dairy animal from the subgroup of dairy animals to be separated as a function of the different types of activity determined for said dairy animal and the duration thereof.

16. The system according to claim 12, wherein the control system is configured to determine the activity level on the basis of the activity observed during a set time period preceding the set end time, and wherein the control system is also configured to determine the individual separation period of each individual dairy animal from the subgroup to be separated as a function of the activity level determined for said dairy animal during the set time period preceding the set end time.

17. The system according to claim 12, wherein the control system is configured to determine the individual separation period for each individual dairy animal from the subgroup to be separated so that the selection device is operated such that, when said dairy animal is present at the selection device, said dairy animal is guided to the separation room if the observed activity level lies below a threshold level for low activity.

18. The system according to claim 17, wherein the control system is configured to set the threshold level for low activity separately for each individual dairy animal from the subgroup to be separated.

19. The system according to claim 12, wherein the observation system is configured to observe the position of each individual dairy animal which is present in the lying and eating area and/or milking area of the living area.

20. The system according to claim 19, wherein the observation system is fitted with:
a number of beacons, wherein each beacon is arranged at a fixed position in the living area at a distance from the other beacons, and wherein each beacon is configured to emit a signal with a fixed signal strength and with a signal frequency which differs from the signal frequency of the other beacons;
sensors which are each mounted on one of the dairy animals, wherein each sensor is configured to receive the signals emitted by the beacons and measure the reception strength of each of the signals received; and
a control unit which is connected to the sensors for receiving the reception strength measured by the sensors of each of the signals emitted by the beacons, wherein the control unit is configured to determine the position of the dairy animals on the basis of the reception strength measured by the sensors of each of the signals emitted by the beacons.

21. The system according to claim 12, wherein the control system is configured to enclose a dairy animal visiting the milking station in the milking station so that it can be milked by a milking robot, and after the possible milking of the dairy animal, the dairy animal is then released so it can leave the milking station, and wherein the system is configured to guide the dairy animal to the selection device after it has left the milking station.

22. The system according to claim 12, wherein the control system is configured to select the individual separation period for said dairy animal as a function of a milking behaviour property of said dairy animal, an individually desired milking interval for said dairy animal being determined by the desired duration between two successive milkings for said dairy animal, and/or an individually averaged milking interval for said dairy animal determined from the average of a plurality of measured values for the duration between two successive milkings for said dairy animal, and/or an individually averaged visit interval for said dairy animal being determined by the average of a plurality of measured values for the duration between two successive visits for said dairy animal to a milking station for milking the dairy animals.

\* \* \* \* \*